(12) United States Patent
Lin et al.

(10) Patent No.: US 6,853,846 B1
(45) Date of Patent: Feb. 8, 2005

(54) DOUBLE-THRESHOLD ADMISSION CONTROL METHOD IN CLUSTER-BASED MICRO/PICOCELLULAR WIRELESS NETWORKS

(75) Inventors: Hwa-Chun Lin, Taiwan (TW); Show-Shiow Tzeng, Taiwan (TW); Chien-Lin Chen, Taiwan (TW)

(73) Assignee: Institute for Information Industry, Taipei (TW)

( * ) Notice: Subject to any disclaimer, the term of this patent is extended or adjusted under 35 U.S.C. 154(b) by 632 days.

(21) Appl. No.: 09/711,930

(22) Filed: Nov. 15, 2000

(51) Int. Cl.$^7$ .............................................. H04B 10/10
(52) U.S. Cl. .................... 455/453; 455/422.1; 455/436; 455/450
(58) Field of Search .............................. 455/422.1, 423, 455/424, 426.1, 426.2, 428, 432.1, 434, 435.1–435.3, 436, 443, 444, 445, 446–453

(56) References Cited

U.S. PATENT DOCUMENTS

| | | | | |
|---|---|---|---|---|
| 5,301,356 A | * | 4/1994 | Bodin et al. ................. | 455/436 |
| 5,497,504 A | * | 3/1996 | Acampora et al. .......... | 455/436 |
| 5,884,174 A | * | 3/1999 | Nagarajan et al. .......... | 455/453 |
| 6,049,593 A | * | 4/2000 | Acampora .................... | 455/449 |
| 6,600,924 B1 | * | 7/2003 | Sinivaara et al. ............ | 455/444 |

* cited by examiner

*Primary Examiner*—David Hudspeth
*Assistant Examiner*—Kamran Afshar
(74) *Attorney, Agent, or Firm*—Bacon & Thomas, PLLC

(57) ABSTRACT

There is disclosed a double-threshold admission control method in cluster-based micro/picocellular wireless networks. The method provides a cluster level threshold and cell level threshold. When the number of occupied channels in the cluster is less than the cluster level threshold and the number of occupied channels in the cell is less than the cell level threshold the mobile user is admitted to enter a cell. Otherwise, the mobile user is refused to enter the cell.

5 Claims, 5 Drawing Sheets

DOUBLE-THRESHOLD ADMISSION CONTROL METHOD IN CLUSTER-BASED MICRO/PICOCELLULAR WIRELESS NETWORKS

BACKGROUND OF THE INVENTION

1. Field of the Invention

The present invention relates to a admission control method in wireless networks and, more particularly, to a double-threshold admission control method in cluster-based micro/picocellular wireless networks.

2. Description of Related Art

Wireless networks provide wireless access to mobile users. With the growth of the number of mobile users and the emergence of broadband services, the demand for higher network capacity is increasing. In order to provide higher capacity under limited radio spectrum, micro/picocellular architectures for wireless networks have been proposed. These architectures have the advantages of higher throughput, lower power requirement for transmitters and higher radio frequency reuse due to reduced cell size.

With smaller cell size, the frequency of hand-off events will increase. This will in turn increase the overheads for processing hand-off events. To reduce the overheads due to frequent hand-off, Posner and Guerin proposed to reserve a number of guard channels at each base station for hand-off calls (See E. C. Posner and R. Guerin, "Traffic Policies in cellular Radio that Minimize Blocking of Handoff Calls, "Proc. 11th Teletraffc Cong. (ITC 11), Kyoto, Japan, September 1985). New calls are limited to use the rest of the channels. Therefore, new calls are not admitted when there are no free channels for new calls. However, new calls can still be admitted under heavy load when active calls hand-off to neighboring cells and release channels for new calls. Eventually, some of the cells may become congested resulting in increased hand-off dropping probability.

In addition, Naghshineh and Acampora proposed a call admission policy for cluster-based micro/picocellular wireless networks such that the call hand-off dropping probability and forced call termination probability can be kept below a predetermined level (See M. Naghshineh and A. S. Acamporo, "Design and Control of Microcellular Networks with QOS Provisioning for Realtime Traffic," J. High-Speed Networks, vol. 4, no. 5, pp. 53–71, 1996). An admission threshold at the cluster level is used to limit the admission of new calls. When a new call arrives, the call is admitted if the number of active calls in the cluster is less than the admission threshold; otherwise, the call is rejected. The admission threshold can be properly selected such that a predetermined level of call hand-off dropping probability and forced call termination probability will not be exceeded. This policy remedies the drawback of the policy proposed by Posner and Guerin. However, this policy poses another problem. Since new calls arrive at the cells randomly, some of the cells in a cluster may become congested before the number of active calls in a cluster: exceeds the admission threshold. Therefore, the above conventional call admission methods are not satisfactory, and a novel method that can mitigate and/or obviate the aforementioned problems is desired.

SUMMARY OF THE INVENTION

The object of the present invention is to provide a double-threshold admission control method in cluster-based micro/picocellular wireless networks for decreasing the hand-off dropping probability, so as to avoid call blocking and increase network throughput.

To achieve the object, the admission control method of the present invention is used in cluster-based micro/picocellular wireless networks for determining whether a new mobile user is admitted to enter a cell upon arriving the cell, wherein a cluster has a plurality of cells and a cell has a plurality of channels. The method provides a cluster level threshold and cell level threshold. When the number of occupied channels in the cluster is less than the cluster level threshold and the number of occupied channels in the cell is less than the cell level threshold the mobile user is admitted to enter the cell. Otherwise, the mobile user is refused to enter the cell.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
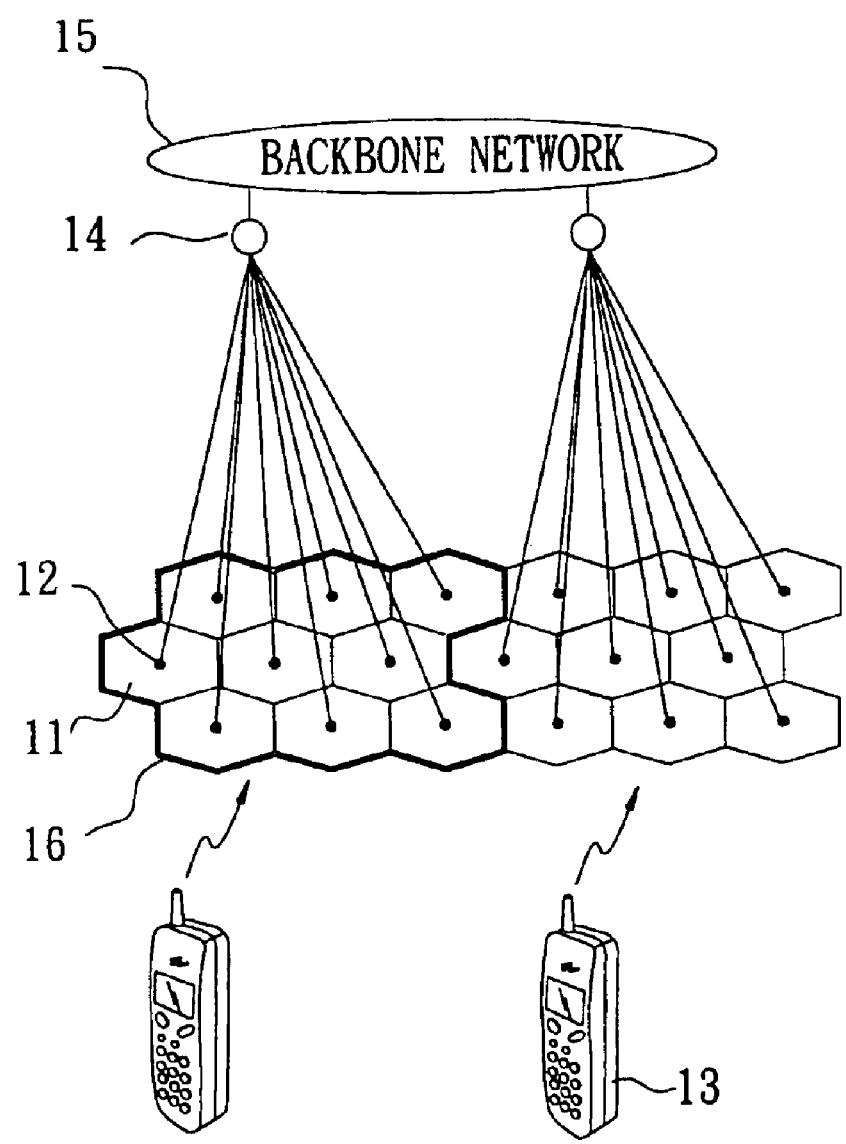
FIG. 1 is a system architecture for performing the admission control method in accordance with the present invention.

With reference to FIG. 1, there is shown a system architecture for the double-threshold admission control method in cluster-based micro/picocellular wireless networks in accordance with the present invention. As shown, the hierarchy of the system consists of three levels. The mobile users 13 are at the lowest level. There is a base station 12 in each cell 11 which provides wireless access to mobile users 13. The base stations 12 are at the next level of the hierarchy. At the highest level, a number of base stations 12 are controlled by a switch 14 which is connected to the wired backbone network 15. The collection of cells 11 covered by the base stations 12 under the control of a switch 14 is called a cluster 16.

Figure 2:
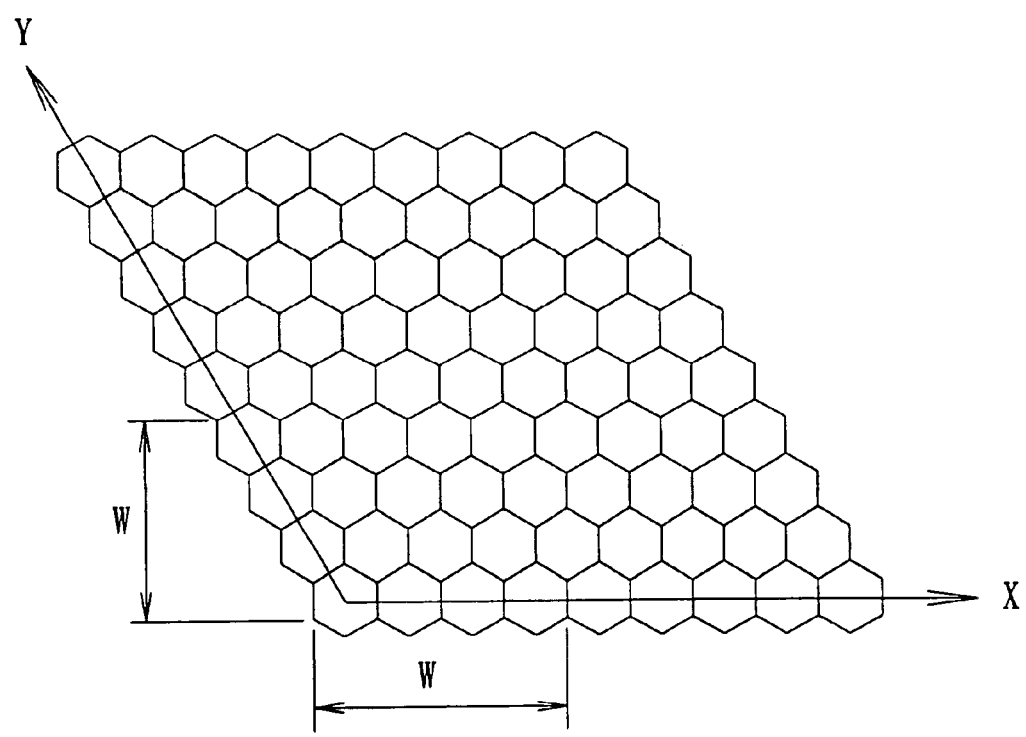
FIG. 2 schematically illustrates a two dimensional space provided by the system architecture of FIG. 1.

The environment considered in the above system architecture is a large two dimensional space consisting of a plurality of cells 11. In general, the shape of a cluster 16 may be irregular, and the numbers of cells 11 in the clusters 16 may be different. For simplicity, the shape of each cluster 16 is selected to be equilateral parallelogram with W cells 11 on each side, as shown in FIG. 2. The number of cells 11 on each side of a cluster 16, W, is at least 2. Fixed channel assignment policy is used in the present system model. The number of channels in a cell 11 is denoted by C. The number of channels in a cluster is $CW^2$.

The purpose of call admission control is to reduce the probability of a cell being in the congested state by limiting the admission of new calls such that the probability of a hand-off call encountering a congested cell is acceptably low. The present invention provides a call admission policy with two levels of admission thresholds, namely, cluster level threshold and cell level threshold, for cluster-based micro/picocellular wireless networks. When a new mobile user 13 arrives at a cell 11, the mobile user 13 is admitted if the number of occupied channels in the cluster 16 is less than the cluster level threshold and the number of occupied channels in the cell 11 is less than the cell level threshold. Hand-off calls are not restricted by the thresholds. The cluster level threshold is used to reduce the probability that a cluster 16 becomes congested under heavy load. The purpose of the cell level threshold is to reduce the probability of localized congestion in a cell 11.

On the contrary, if the number of occupied channels in the cluster 16 is more than the cluster level threshold or the number of occupied channels in the cell 11 is more than the cell level threshold, the mobile user 13 is refused to enter the cell 11.

Let the admission thresholds for a cluster 16 and a cell 11 be denoted by T and t respectively. The cluster level threshold, T, is equal to or less than the total number of channels in a cluster 16, $CW^2$, and the cell level threshold, t, is equal to or less than the number of channels in a cell C. When $T=CW^2$, it is equivalent to not placing any threshold at the cluster level. Similarly, when t=C, it is equivalent to not having a threshold at the cell level. It is obvious that t must be at least one and T must be at least $W^2$; otherwise, one or more cells 11 will never admit any new call.

With the use of the cluster level threshold and the cell level threshold, the call hand-off dropping probability can be restricted not to exceed a predetermined maximum level and that the throughput of the network is as large as possible. For the selection of the thresholds, first of all, the combinations of the cluster and cell level thresholds that can guarantee the predetermined call hand-off dropping probability under any load condition are found. Then, a particular combination of cluster and cell level thresholds that results in the maximum throughput of the network among the combinations which satisfy the bound on call hand-off dropping probability is found.

Figure 3:
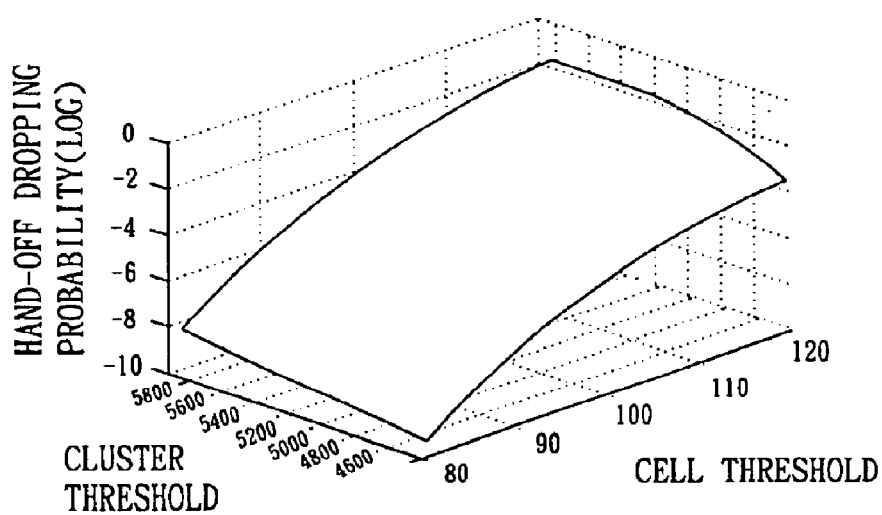
FIG. 3 shows the asymptotic call hand-off dropping probability for the combination of the cluster and cell level thresholds.
Figure 4:
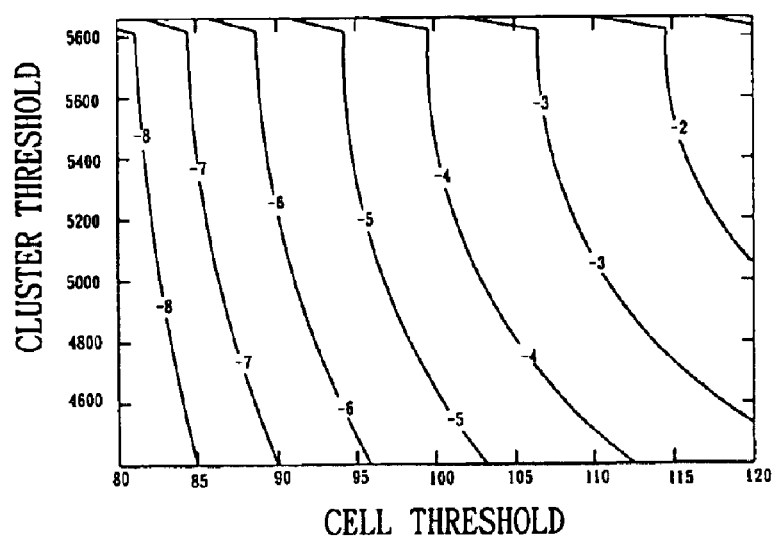
FIG. 4 shows a projection of the asymptotic call hand-off dropping probability of FIG. 3.

For example, when considering a system in which the number of cells 11 on each side of a cluster 16, W, is 7, and the number of channels in a cell, C, is 120, the asymptotic call hand-off dropping probability is plotted in FIG. 3 for all possible combinations of the cluster and cell level thresholds. Projecting the curves corresponding to call hand-off dropping probabilities of $10^{-2}$, $10^{-3}$, $10^{-4}$, $10^{-5}$, $10^{-6}$, $10^{-7}$, and $10^{-8}$ on the cluster-cell-threshold plane, multiple curves as shown in FIG. 4 is obtained. The area to the left of a particular curve contains all the combinations of cluster and cell level thresholds that produce call hand-off dropping probabilities not exceeding the asymptotic hand-off dropping probability corresponding to the curve.

Figure 5:
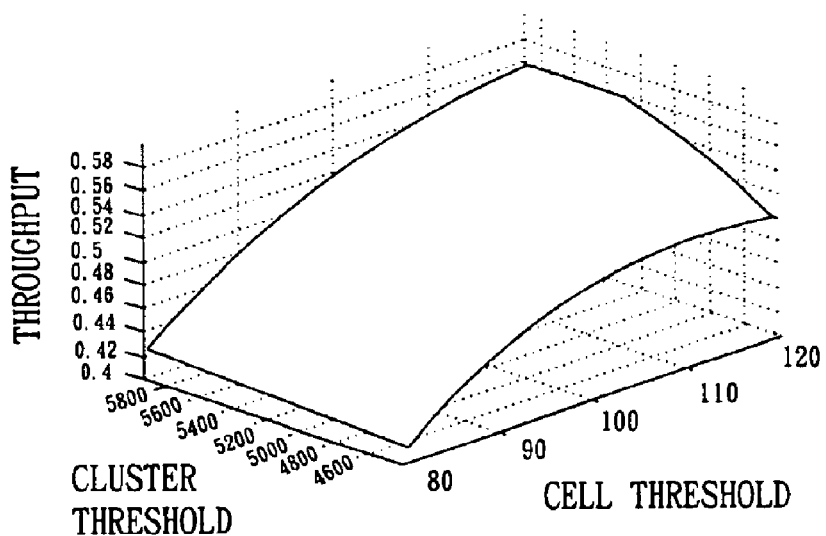
FIG. 5 shows the throughput per channel for all combinations of the cluster and cell level thresholds under the condition that the Erlang load per channel is 0.95.
Figure 6:
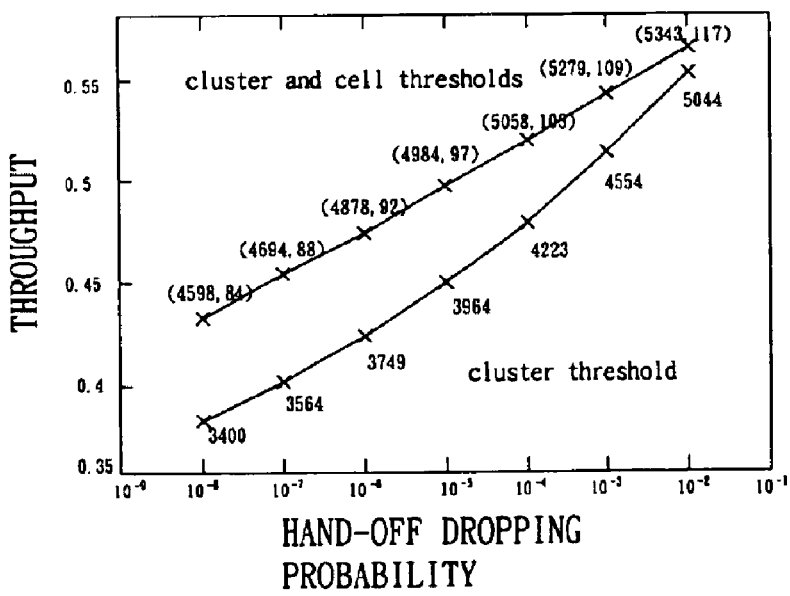
FIG. 6 shows the throughput and thresholds for different maximum levels of asymptotic hand-off dropping probability.

In FIG. 5, the throughput per channel for all combinations of the cluster and cell level thresholds is plotted under the condition that the Erlang load per channel is 0.95. Using the data generated for this figure, the particular combination of cluster and cell level thresholds which produces the maximum throughput among the feasible combinations can be found. Recall that the feasible combinations of the cluster and cell thresholds can be found in FIG. 4. FIG. 6, shows the values of the cluster level and cell thresholds and the corresponding maximum throughputs for various asymptotic call hand-off dropping probabilities. In the figure, the two numbers in the parentheses are the values of the cluster and cell level thresholds respectively.

To verify the advantage of the method in accordance with the present invention, the performance of the call admission policy (denoted by "cluster and cell thresholds") proposed by the present method and the conventional policy (denoted by "cluster threshold") proposed by Nagtshineh and Acamporo is compared under the condition that both of the policies provide the same maximum level of call hand-off dropping probability. The maximum level of call hand-off dropping probability is selected to be $10^{-5}$. The number of cells 11 on each side of a cluster 16, W, is 7. The number of channels in a cell 11, C, is 120. From FIG. 6, the cluster and cell level thresholds for the call admission policy proposed by the present method are 4984 and 97 respectively. The cluster level threshold for the policy proposed by Nagtshineh and Acamporo is 3964.

Figure 7:
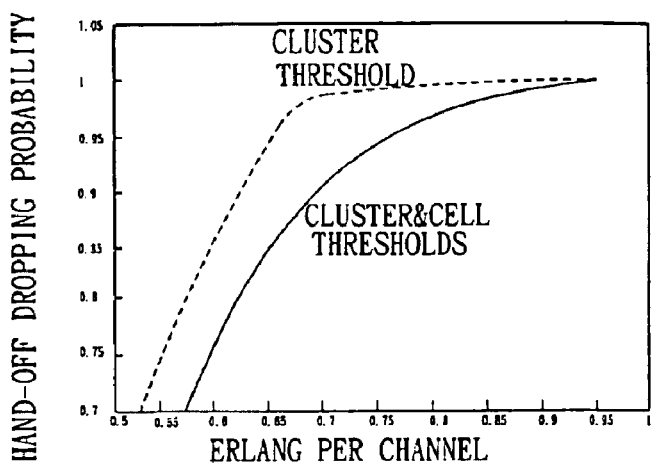
FIG. 7 shows a comparison of hand-off dropping probabilities.
Figure 8:
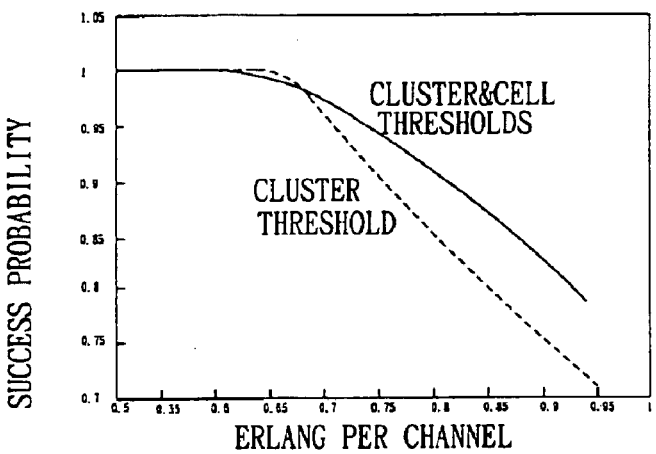
FIG. 8 shows a comparison of success dropping probabilities.
Figure 9:
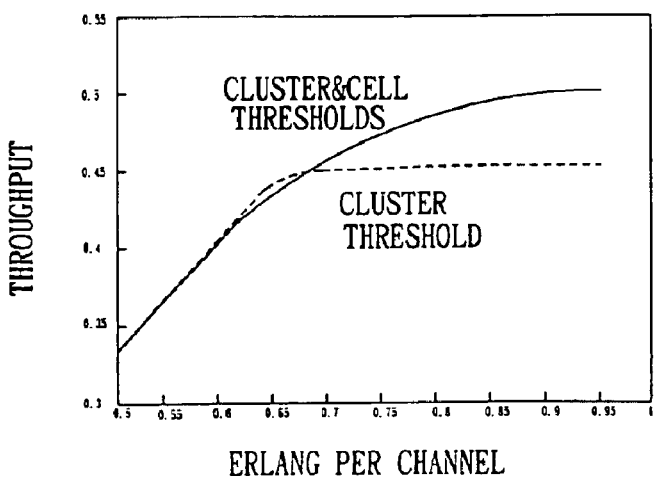
FIG. 9 shows a comparison of throughput per channel.

FIG. 7 shows the hand-off dropping probabilities for both policies. From the figure, it is shown that the policy proposed by the present method produces significantly lower hand-off dropping probability than the conventional policy. FIGS. 8 and 9 show that the proposed policy of the present method produces significantly higher success probability and throughput per channel when the load is heavy.

Although the present invention has been explained in relation to its preferred embodiment, it is to be understood that many other possible modifications and variations can be made without departing from the spirit and scope of the invention as hereinafter claimed.

What is claimed is:

1. An admission control method used in cluster-based micro/picocellular wireless networks for determining whether a new mobile user is admitted to enter a cell upon arriving in the cell, wherein a cluster has a plurality of cells and a cell has a plurality of channels, the method comprising the steps of:

(A) providing a cluster level threshold and cell level threshold; and (B) admitting the mobile user to enter the cell if the number of occupied channels in the cluster is less than the cluster level threshold and the number of occupied channels in the cell is less than the cell level threshold; otherwise, refusing the mobile user to enter the cell, wherein the cluster level threshold and the cell level threshold are selected in such a manner that combinations of the cluster and cell level thresholds that can guarantee a predetermined call hand-off dropping, probability under any load condition are first found, and then, a particular combination of cluster and cell level thresholds that results in a maximum through nut of the network among the combinations which satisfy a bound on call hand-off dropping probability is found.

2. The method as claimed in claim 1, wherein the cluster level threshold is equal to or less than the total number of channels in a cluster, and the cell level threshold is equal to or less than the number of channels in a cell.

3. The method as claimed in claim 2, wherein the cell level threshold is at least one and the cluster level threshold is at least the number of cells in the cluster.

4. The method as claimed in claim 1, wherein the cluster level threshold is used to reduce the probability that a cluster becomes congested under heavy load.

5. The method as claimed in claim 1, wherein the cell level threshold is used to reduce the probability of localized congestion in a cell.

* * * * *